United States Patent [19]

Shiomi et al.

[11] Patent Number: 5,012,332
[45] Date of Patent: Apr. 30, 1991

[54] CORRECTING DATA READING DEVICE IN A DIGITAL CONVERGENCE CORRECTING DEVICE

[75] Inventors: Makoto Shiomi; Kosuke Ozeki, both of Yokohama; Michitaka Ohsawa; Kuninori Matsumi, both of Fujisawa; Tadahiro Kawagishi, Yokohama, all of Japan

[73] Assignees: Hitachi, Ltd., Tokyo; Hitachi Video Engineering, Inc., Kanagawa, both of Japan

[21] Appl. No.: 301,954

[22] Filed: Jan. 26, 1989

[30] Foreign Application Priority Data

Jan. 28, 1988 [JP] Japan ................... 63-15998

[51] Int. Cl.$^5$ .............................. H04N 9/16
[52] U.S. Cl. .............................. 358/64; 315/368
[58] Field of Search ............ 358/64, 56, 60, 65; 315/368

[56] References Cited

U.S. PATENT DOCUMENTS 4,401,922 8/1983 Kamata et al. ............ 315/368
4,771,334 9/1988 Bolger ...................... 358/64
4,816,908 3/1989 Colineau et al. .......... 358/64

FOREIGN PATENT DOCUMENTS 56-40355 9/1981 Japan .

Primary Examiner—Edward L. Coles, Sr.
Assistant Examiner—Thomas D. Lee
Attorney, Agent, or Firm—Antonelli, Terry, Stout & Kraus

[57] ABSTRACT

A digital convergence correcting device effecting convergence correction by using convergence correcting data stored in a memory which includes an address fixing device which, in the case where convergence correcting data are insufficient, reads out in succession the correcting data corresponding to the last horizontal scanning line for the portion lacking in the data so that the correcting data are used repeatedly, and which, in the case where convergence correcting data are excessive, only necessary convergence correcting data are used.

7 Claims, 10 Drawing Sheets $\bar{H}$

C

→ t

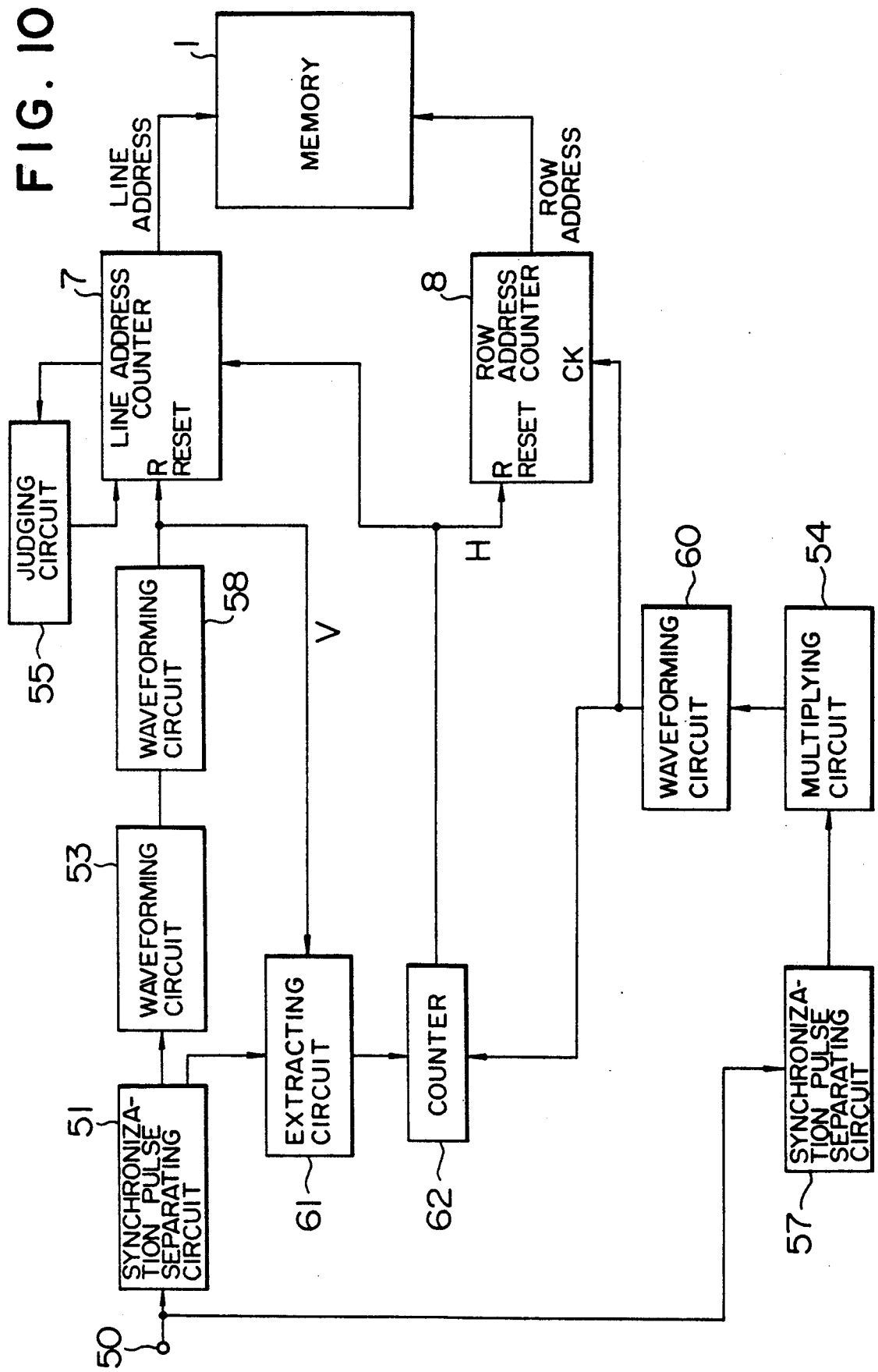

CORRECTING DATA READING DEVICE IN A DIGITAL CONVERGENCE CORRECTING DEVICE

BACKGROUND OF THE INVENTION

This invention relates to a device for correcting the convergence of an electron beam in a color television receiver and in particular to a digital convergence correcting device used in the case where a high precision convergence correction is required.

A prior art digital convergence correcting device is disclosed in JP-B-56-40355. According to the invention disclosed in this publication, convergence correcting waveforms (correcting data) are stored in a memory and the correcting data corresponding to the position of the scanning line are read out from the memory to correct the convergence. This prior art example is shown in FIG. 11.

In FIG. 11 convergence correcting waveforms corresponding to the position of the scanning line on the image screen are stored as correcting data in a memory 1. These correcting data stored in the memory 1 are read out in synchronism with the scanning of the image screen and supplied to a D/A converter 2. The correcting data are converted into analog signal in the D/A converter 2. Thus, a continuous analog correcting waveform signal is outputted through a low pass filter (LPF) 3. Further, the output signal of this LPF is inputted to a convergence yoke 5 through a voltage-current converting amplifier 4.

The prior art digital convergence correcting device is used only in there industrial color television receivers, etc., for which a high precision correction was required. For this reason the prior art convergence correcting device was is used in a color television receiver whose input signal is standardized. Consequently, heretofore no attention has been paid to the convergence correction for television signals produced at special reproduction, etc. in VTRs, video disc devices for home use, etc., different from those that are standardized.

For example, for high speed reverse direction picture searches in VTR's, the number of scanning lines on the image screen constituting one field increases. The correcting data stored in the memory 1 are formed on the basis of a standard signal for which the number of scanning lines is predetermined. For this reason, in the prior art convergence correcting device it is not possible to effect the convergence correction corresponding to the increase in the number of scanning lines for high speed reverse direction picture search. As the result, misconvergence takes place in the lower part of the image and image quality is significantly deteriorated.

Hereinbelow, the reason why the number of scanning lines on the image screen constituting one field increases for high speed reverse direction picture searches in VTRs, for home use will be explained, referring to FIGS. 12(a), 12(b), 13(a) and 13(b).

FIG. 12(a) is a scheme for explaining video tracks 11 for the image signal recorded on a video tape 10 for a VTR. In the figure, for normal reproduction a video head 12 scans the tape as indicated by an arrow 13 to reproduce the image signal recorded on the video track 11. Information corresponding to one field is recorded in the video track 11. Denoting the displacement velocity of the video tape 10 at this time by $v_t$ and the peripheral velocity of the cylinder (not shown in the figure) around which the tape is wound, by $v_{cl}$ the velocity of the video head 12 with respect to the tape can be represented by the vector sum of $v_t$ and $v_{cl}$.

Next, the state in which the video tape is scanned in the reverse direction is indicated in FIG. 13(a). The video head 12 scans the tape, as indicated by arrow 14, and reproduces the image signal on the video track 11 along an oblique direction. The velocity of the video tape 10 at this time is represented by $-v_t$.

Accordingly, in the state indicated in FIG. 13(a), the velocity of the video tape 10 $-v_t$, the peripheral velocity of the cylinder $v_{c2}$ and the velocity of the video head 12 with respect to the tape $v_r$ have a vectorial relationship as indicated in FIG. 13(b).

In this case, the scanning length in FIG. 13(a) is longer than in FIG. 13(b) and the number of scanning lines in one field increases.

In the above, for the description purpose of simplifying explanation, it was assumed that the image is reproduced with the same speed in the reverse direction. The above explanation is valid also for a high speed reverse direction picture search. Consequently, with increasing of the speed of the picture search in the reverse direction, the number of scanning lines in one field increases. In a usual VTR the number of scanning lines can increase by about 20 lines. That is, the number of scanning lines in one field can be greater than 260.

It is a matter of course that the number of scanning lines in one field decreases for a forward direction picture search, contrarily with respect to that in the reverse direction.

For this reason, in the case where correcting data for the digital convergence correction corresponding to the number of scanning lines for the standard image signal are stored in the memory, the state in which correcting data are insufficient or excessive can take place.

As described above, the prior art industrial digital convergence correcting device has a problem as follows: the convergence correction is impossible for the image signals whose number of scanning lines is increased or decreased for special reproduction in VTRs, etc., which gives rise to the problem that misconvergence takes place in the part of the image screen corresponding to the increase or decrease in the number of scanning lines and the image quantity is deteriorated.

SUMMARY OF THE INVENTION

The object of this invention is to provide a digital convergence correcting device which prevents that misconvergence (deterioration in the image quality) which takes place in any part of the whole image screen, even in the case where the convergence is corrected for signals whose number of scanning lines is increased or decreased.

A digital convergence correcting device according to this invention is characterized in that it comprises address signal generating means for supplying read out address signals to a memory in which convergence correcting data are stored, and after having reached the last address signal, it is supplied in succession to the memory. When the vertical scanning of the image screen is terminated, the address signal generating means is reset.

According to this invention in the case where an image signal whose number of scanning lines is greater than that of the standard image signal is displayed on the image screen for the part corresponding to the increased number of scanning lines, the correcting data corresponding to the position of the scanning line just prior thereto (the last scanning line of the standard image signal) are used repeatedly to prevent misconvergence in the part of the image screen described above.

On the contrary, in the case where an image signal whose number of scanning lines is smaller than that of the standard image signal is displayed on the image screen, the operation for reading out the correcting data is reset by the vertical blanking signal so that only the correcting data corresponding to the necessary scanning lines are used.

As described above, according to this invention, convergence correction is possible even if the number of scanning lines varies.

BRIEF DESCRIPTION OF THE DRAWING

FIG. 10 is a block diagram illustrating still another embodiment of this invention;

DESCRIPTION OF THE PREFERRED EMBODIMENTS

Figure 1:
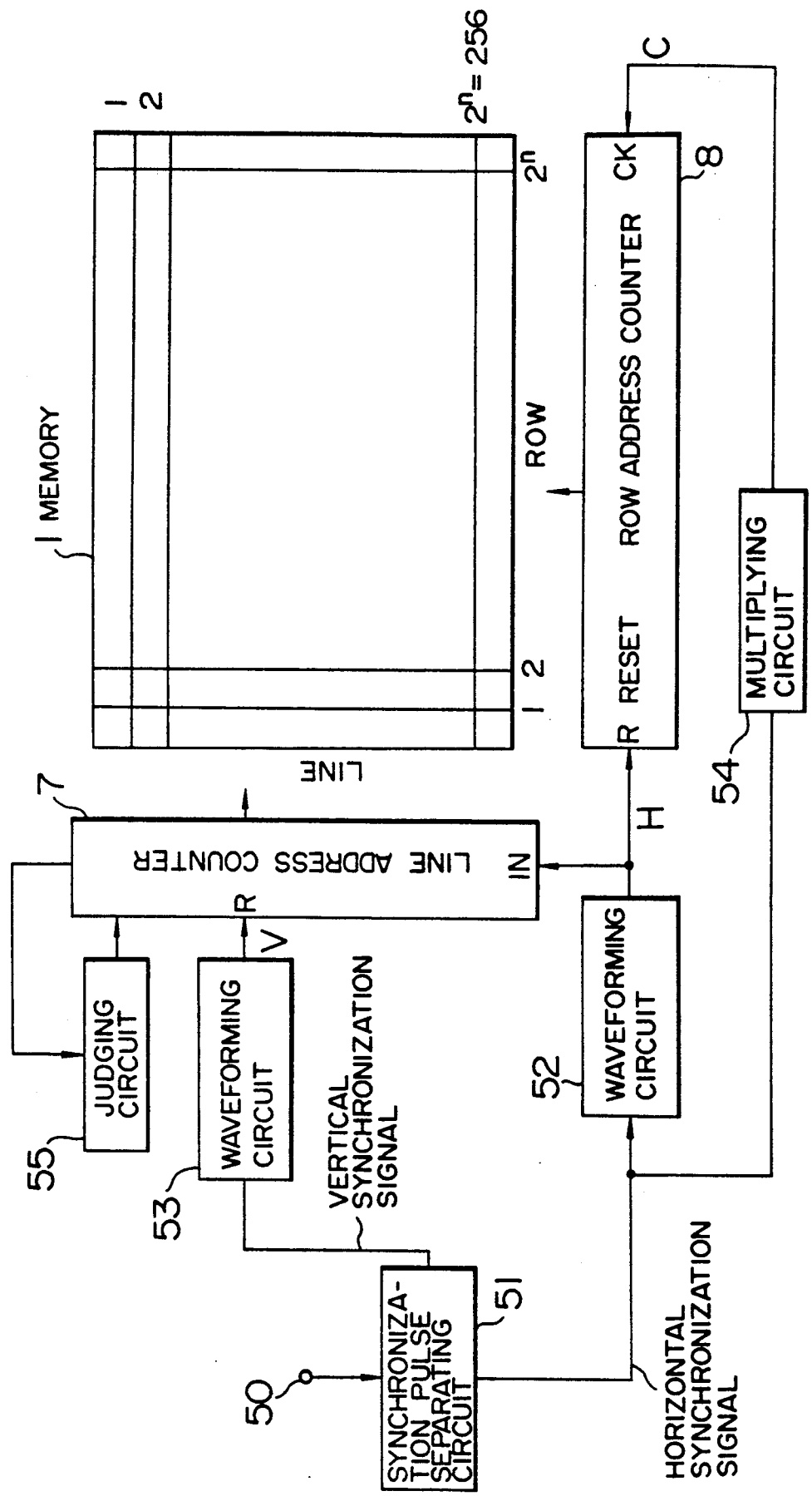
FIG. 1 is a block diagram illustrating an embodiment of this invention.

FIG. 1 is a block diagram illustrating an embodiment of this invention, in which reference numeral 1 is a memory in which convergence correcting data are stored; 7 is a line address counter; 8 is a row address counter; 50 is an input terminal for video signals; 51 is a synchronization pulse separating circuit; 52 and 53 are waveforming circuits; 54 is a multiplying circuit; and 55 is a judging circuit.

Figure 2:
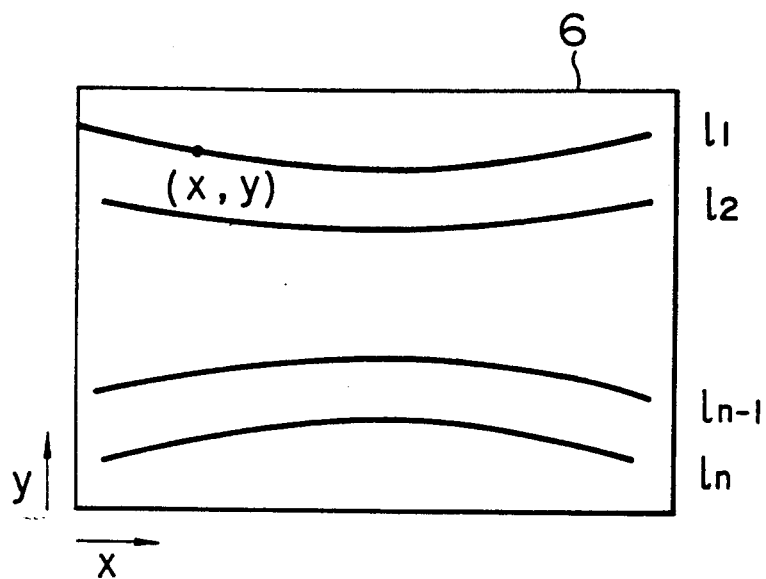
FIG. 2 is a front view of an image screen of a television receiver, indicating the aspect of scanning lines.

FIG. 2 is a front view of an image screen of a television receiver. In the figure the position in the horizontal direction is represented by x and the position in the vertical direction by y. The correcting data in the horizontal direction and those in the vertical direction corresponding to coordinates (x, y) of scanning lines 1, 2, 3, ..., n in the horizontal direction are stored in the memory 1 in FIG. 1.

For a color television receiver, correction data are necessary for 3 sorts of signals red, green and blue, but here, for the sake of simplifying explanation, only the horizontal direction correcting data for green will be explained.

In FIG. 1, access positions for the data stored in the memory 1 are set by line and row address signals. That is, the access positions for the data stored in the memory 1 are set by the line address signal coming from the line address counter 7 and the row address signal coming from the row address counter 8. The addresses of the scanning lines 1, 2, 3, ..., n on the image screen correspond to line addresses. Consequently the line address counter 7 generates line address signals by counting pulses H having the same repetition frequency as the horizontal synchronization signal. Further, the row address corresponds to the position x on the scanning line. Consequently, the row address counter 8 generates row address signals by counting reference clock pulses C having a predetermined clock frequency and it is reset by the pulses H described above.

Now various sorts of pulses for controlling the line address counter 7 and the row address counter 8 will be described.

The video signal is inputted in the terminal 50 and the horizontal synchronization signal and the vertical synchronization signal contained in the video signal are separated from each other in the synchronization pulse separating circuit 51. The separated horizontal synchronization signal is waveformed in the waveforming circuit 52 and inputted in the input clock terminal IN of the line address counter 7. At the same time the horizontal synchronization signal is inputted in the reset terminal R of the row address counter 8 (pulse H).

Further, the separated horizontal synchronization signal is multiplied in the multiplying circuit 54 so as to be transformed into a clock signal having a predetermined pulse frequency. This clock signal is inputted in the input clock terminal CK of the row address counter 8 as clock C. That is, the row address counter 8 counts the clock C and it is reset by the pulse H.

The line address counter 7 counts the pulse H. The vertical synchronization signal is waveformed by the waveforming circuit 53 and outputted as a pulse V, which is inputted to the reset terminal R. The line address counter 7 is reset by this pulse V. Further, when the count number of the line address counter 7 has reached the line corresponding to the position of the last scanning line of the data stored in the memory 1, the judging circuit 55 judges it; the count is stopped at this point of time; and an instruction to hold the count value at this time is supplied to the line address counter.

The greater the number of the correcting data corresponding to the coordinates (x, y) is, the higher the precision is. However it is desirable to form the correcting data, as follows, on the basis of the device necessary for forming them, the time of adjustment and the capacity of the memory.

Figure 3:
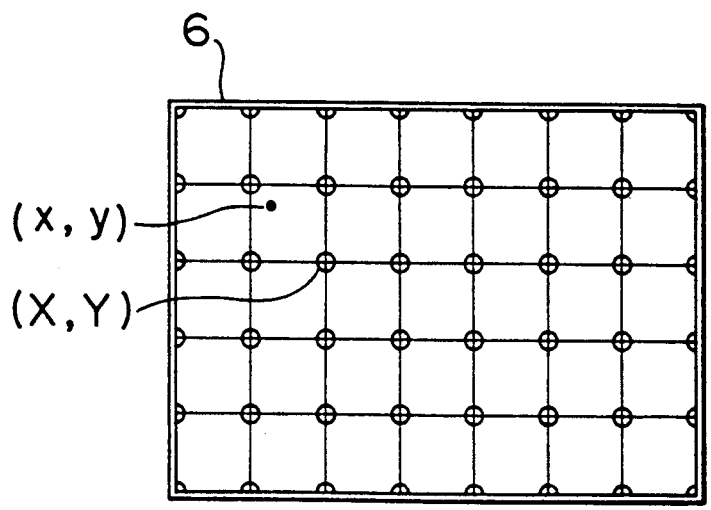
FIG. 3 is a front view of an image screen of a television receiver, indicating the aspect of the convergence correction.

At first the image screen 6 is divided into a lattice shape, as indicated in FIG. 3, and the correcting data are determined for every intersection (X, Y) in the lattice. Then the correcting data are set for an arbitrary position in the coordinates (x, y) by effecting an interpolation operation using the correcting data set for every intersection (X, Y). The position in the ordinate y is determined often, corresponding to the position of the horizontal scanning line and ten and several points in the abscissa x are chosen for every horizontal scanning line in the horizontal direction. Therefore, the region where positions in the coordinates (x, y) are chosen is in accordance with the effective image screen of the television receiver, but the number of points which are actually chosen is determined depending on the capacity of the memory and the power of correction.

Figure 4:
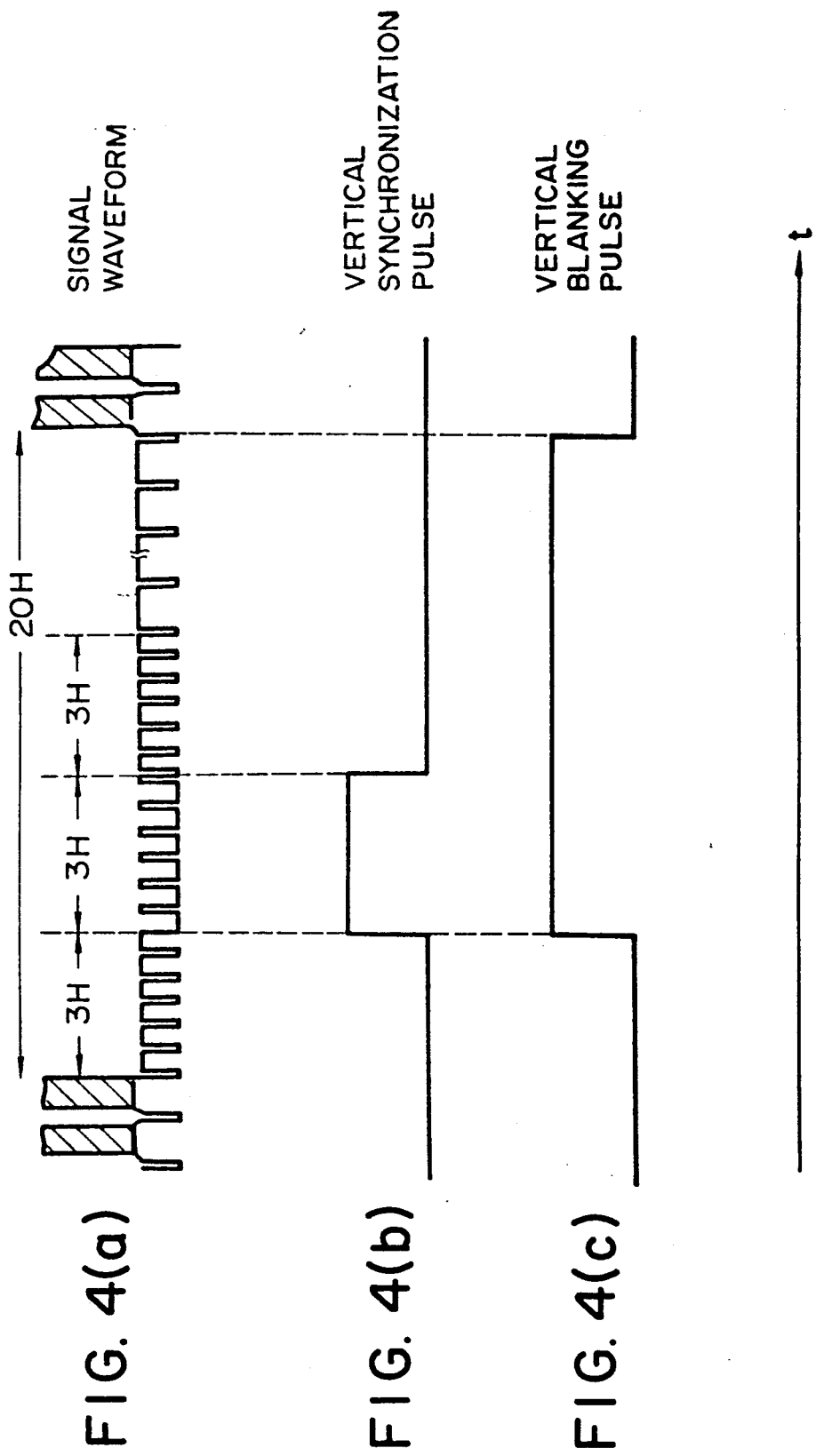
FIG. 4 shows waveforms of the principal part of the television signal.

FIG. 4(a) shows the waveform of the signal around the vertical flyback period (20H), FIG. 4(b) indicates the vertical synchronization pulse, and FIG. 4(c) indicates the pulse V, which is the vertical blanking pulse formed from the vertical synchronization pulse.

As indicated in FIG. 4(a), the number of the effective scanning lines is about 242.5 obtained by subtracting the synchronization from the number of scanning lines in one field, which is 262.5.

For the memory for storing the correcting data, apart from the fact that it has a required capacity, it is desirable that the address assignment can be effected in a simple manner. In this embodiment a memory for general use for 256 lines is used.

From the above explanation it can be understood that the correcting data are stored in 243 lines in the memory for 256 lines.

Consequently, when the line address counter is reset by the falling edge of the pulse V, which is the vertical blanking pulse, the data of 242.5 lines are read out.

Next the operation of this embodiment will be explained more in detail.

Figure 5:
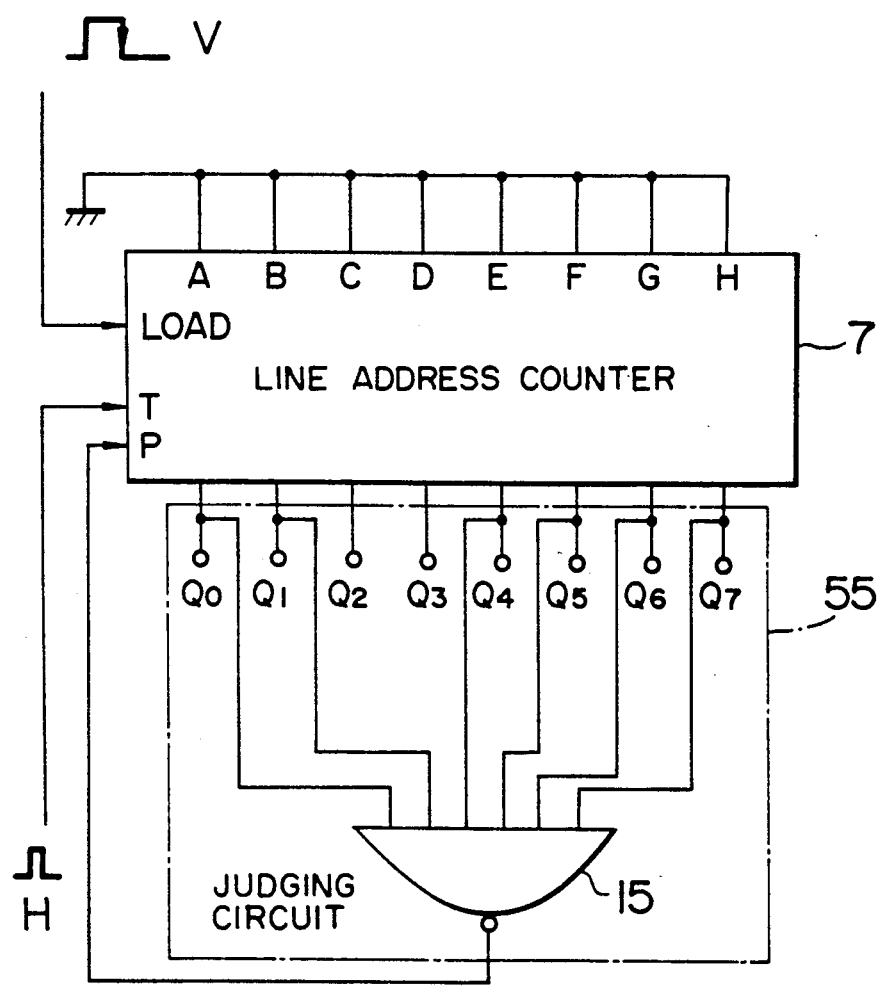
FIG. 5 is a concrete circuit diagram of a principal part of the embodiment indicated in FIG. 1.

FIG. 5 is a circuit diagram indicating a concrete example of the line address counter 7 and the judging circuit 55 in FIG. 1.

Here important points in the operation of the circuit indicated in FIG. 5 are as follows.

(1) The line address counter 7 counts the pulse H, which is the horizontal synchronization pulse, and it is reset by the pulse V, which is the vertical blanking pulse, to load the initial value therein.

(2) When the maximum count number, i.e. 243, is read out, that value, i.e. 243, is held, as it is.

In FIG. 5, A, B, C, D, E, F, G and H in the counter 7 are set at the initial value 0. Output signals $Q_0, Q_1, Q_2, Q_3, Q_4, Q_5, Q_6$ and $Q_7$ are counter output signals. These counter output signals are inputted to the memory and line addresses are assigned. A NAND gate 15 outputs a signal "Low", when the output of the counter 7 is 243. The T input terminal is the input terminal for the pulse H and it is valid, only when a signal "High" is inputted in the P input terminal.

When the number of pulses H inputted in the T input terminal is 243, the potential at the P input terminal becomes "Low" and the counting operation is stopped. After that, the pulse V, which is the vertical blanking pulse, is inputted in the "Load" input terminal. The counter 7 is reset by the pulse V, which is the vertical blanking pulse, and thereafter it begins to count pulses, starting from the initial value 0.

It is a matter of course that, in the case where the number of scanning lines is below 243 such as for a high speed picture search, the counter 7 is reset by the pulse V, which is the vertical blanking pulse, before the count number reaches 243.

Figure 6:
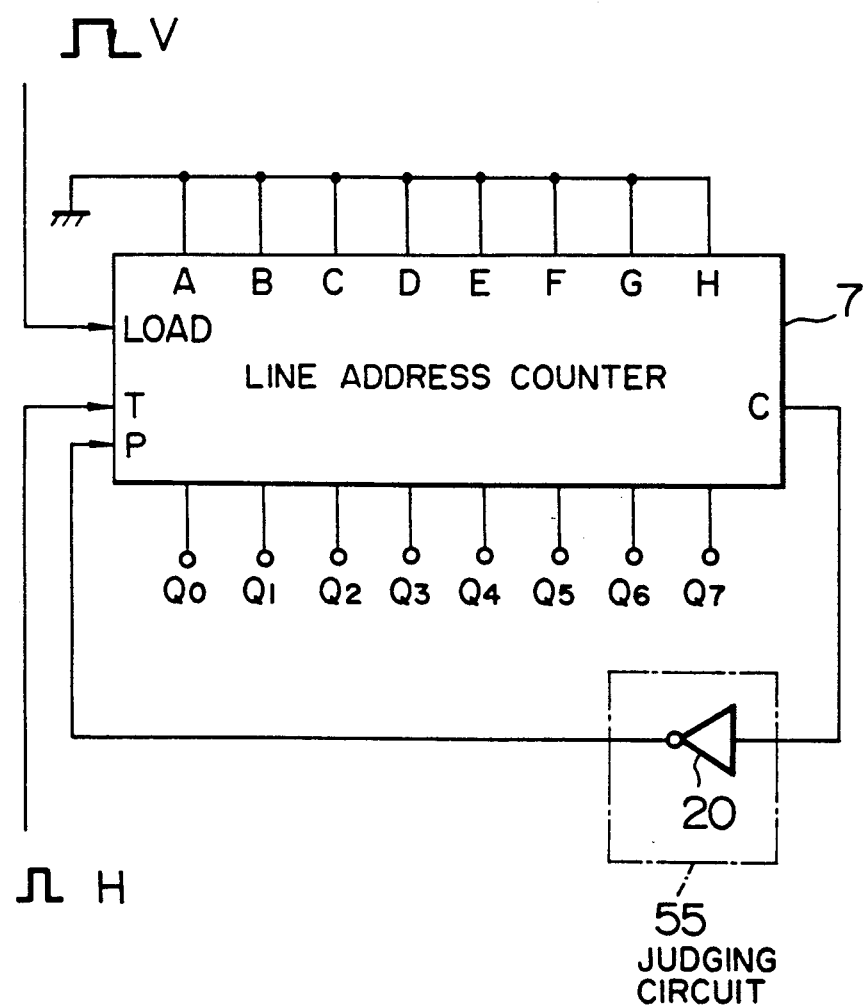
FIG. 6 is a concrete circuit diagram of another principal part of the embodiment indicated in FIG. 1.

Another concrete example of the line address counter 7 and the judging circuit 55 is shown in FIG. 6. The difference between the concrete example indicated in FIG. 6 and that indicated in FIG. 5 is that the maximum value of the count number is 256 in the former (the maximum value of the count number is 243 in the latter). At the maximum count value 256 a signal "High" is outputted from the C output terminal of the counter 7. This signal "High" is converted into a signal "Low" by an inverter 20, which signal "Low" is inputted in the P input terminal. After that the counter 7 is reset by the pulse V, which is the vertical blanking pulse inputted to the input terminal "Load", and begins counting from 0. The example indicated in FIG. 6 is one in which the memory is used efficiently, because the usual memory corresponds to 256 lines. That is, in this concrete example, the correcting data are set corresponding to y in the coordinates (x, y), which is 256, explained referring to FIG. 3.

In the example indicated in FIG. 6, for high speed reverse direction picture search, the correcting data of the 256-th line is used repeatedly. The other operation of the embodiment indicated in FIG. 6 is identical to that in the embodiment indicated in FIG. 5.

Figure 7:
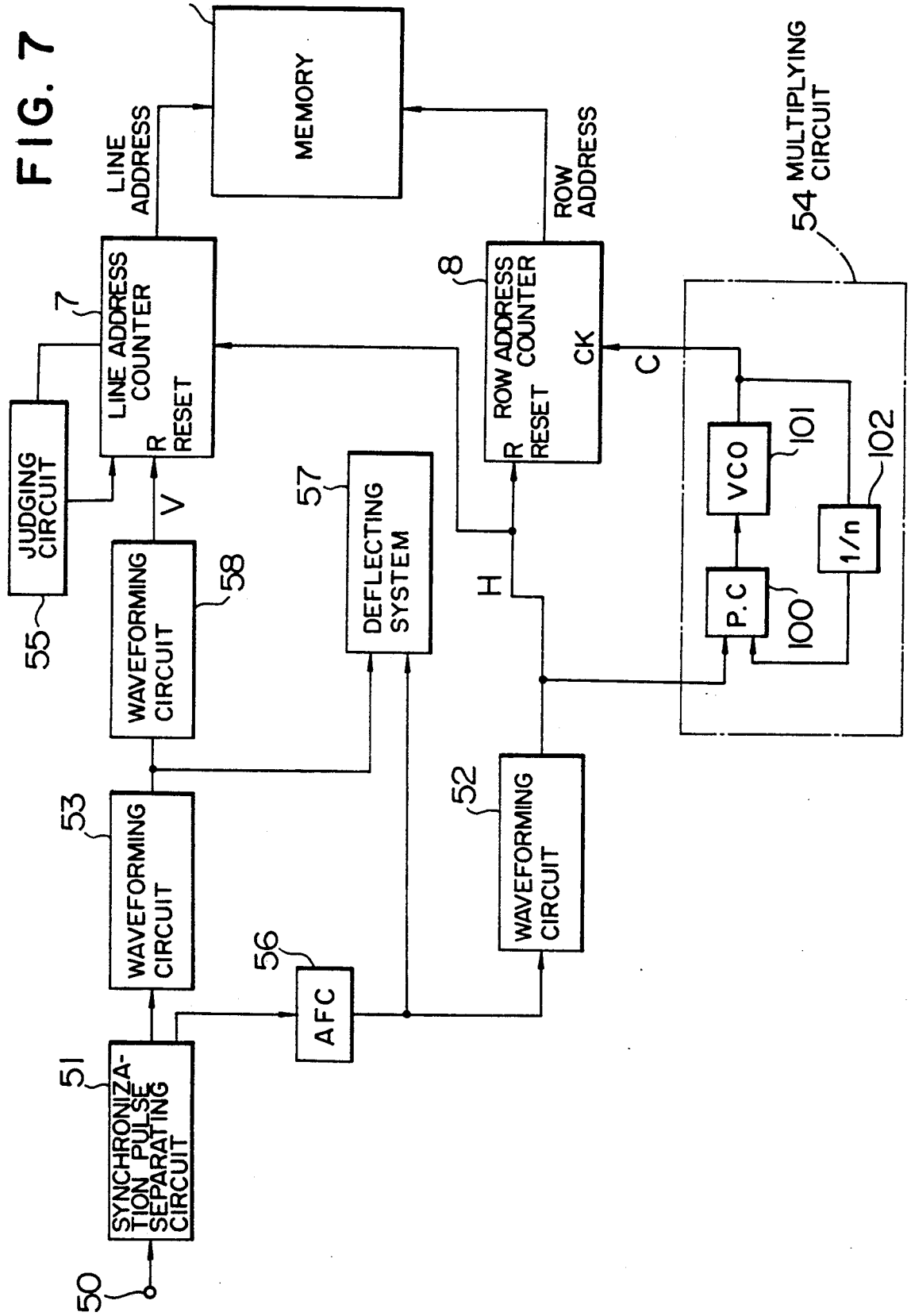
FIG. 7 is a block diagram illustrating another embodiment of this invention.

FIG. 7 is a block diagram illustrating still another embodiment of this invention. The blocks having functions identical to those of the constituting parts of the embodiment indicated in FIG. 1 are denoted by identical reference numerals.

The difference from the embodiment indicated in FIG. 1 is that the line address counter 7 and the row address counter 8 are operated by pulses based on the horizontal and the vertical synchronization signals inputted in the block 57, which represents a deflecting circuit.

The horizontal synchronization signal separated by the synchronization pulse separating circuit 51 passes through an automatic frequency control (AFC) 56 to be inputted to the block 57 representing a deflecting circuit, and at the same time it is inputted to the waveforming circuit 52. The output signal of the waveforming circuit 52 is inputted to the row address counter 8 as the reset pulse and to the row address counter 8 as the input clock C through the multiplying circuit 54.

The AFC 56 and the multiplying circuit 54 are usually composed of a phase locked loop (PLL). Consequently, the S/N of the horizontal synchronization signal inputted to the multiplying circuit 54 is improved by the AFC 56 and thus it is possible for the design of the multiplying circuit 54 to provide emphasis in the capture range rather than in the S/N characteristics.

The multiplying circuit 54, in which a PLL is used, consists of a phase comparator (PC) 100, a voltage controlled oscillator (VCO) 101, a frequency divider (1/n) 102, etc. Generally the central frequency of the voltage controlled oscillator 101 is used after having being well adjusted. However, as described above, by widening the capture range the adjustment is made unnecessary, which brings about a cost merit.

Further the pulse V for the reset inputted in the line address counter 7 is a signal obtained by waveforming the clock signal synchronized with the vertical synchronization signal inputted to the deflection circuit block 57 by means of the waveforming circuit 58.

As can be understood from the above explanation, the operation of the line address counter 7 and the row address counter 8 is in synchronism with the deflection circuit block 57. Consequently, even in the case where the operation of the deflection circuit block 57 is disturbed by external disturbance, etc., since the operation of the digital convergence is disturbed in synchronism therewith, an advantage is obtained that deterioration in the image quality is reduced.

Figure 8:
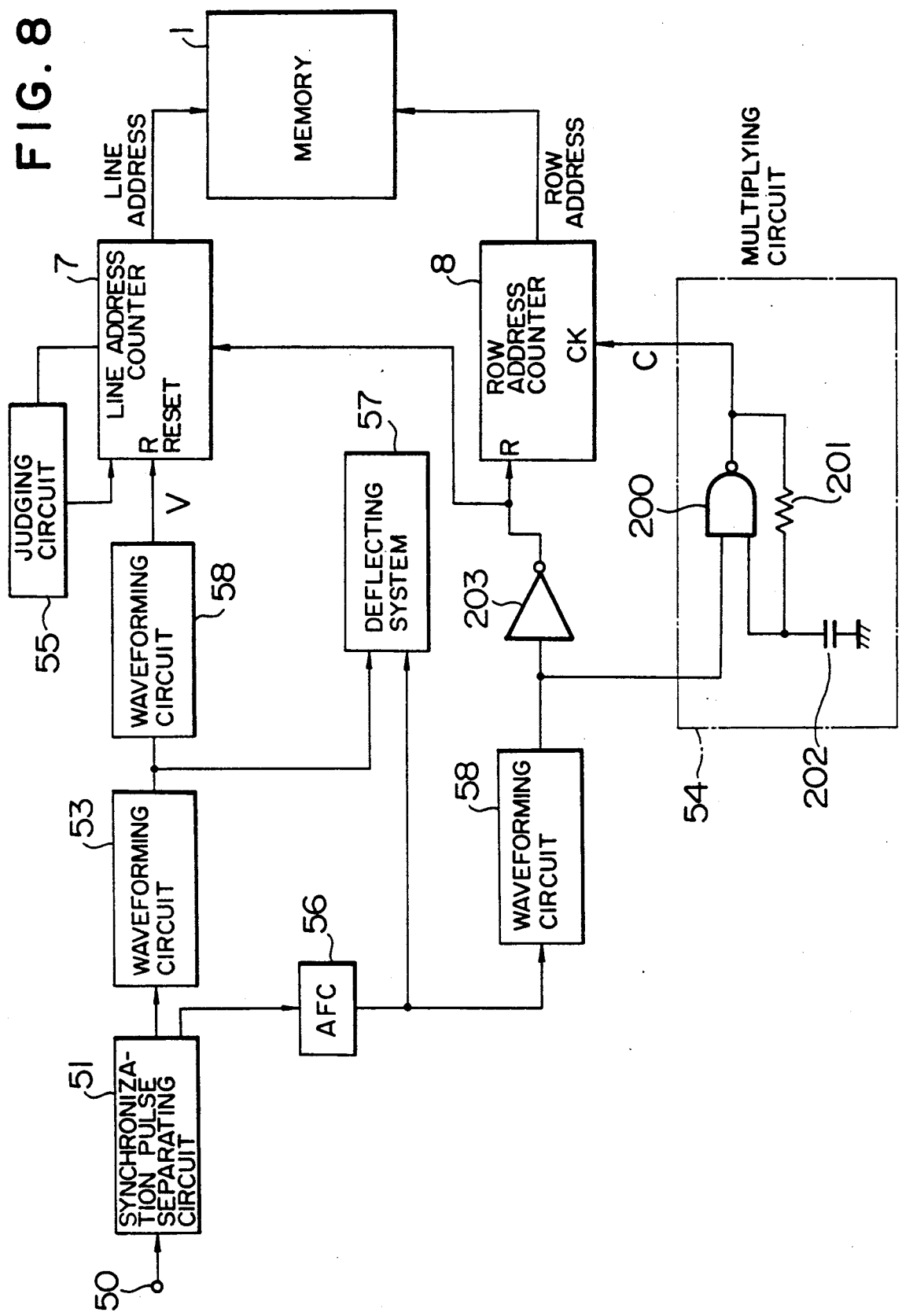
FIG. 8 is a block diagram illustrating still another embodiment of this invention.

FIG. 8 illustrates still another embodiment of this invention. The difference thereof from the embodiment indicated in FIG. 7 consists in the connecting structure among the multiplying circuit 54, the waveforming circuit 58 and the inverter 203.

Figure 9A:
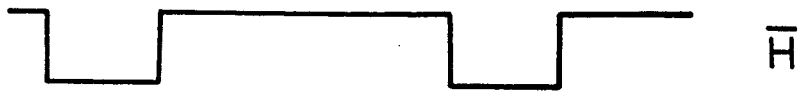
FIG. 9 shows a signal waveform in the principal part of the circuit indicated in FIG. 8.

The multiplying circuit 54 generates the input clock C inputted to the row address counter 8, which clock C is in synchronism in phase with the horizontal synchronization signal. In the embodiment indicated in FIG. 8, the multiplying circuit 54 is composed of an NAND gate 200, a resistor 201 and a capacitor 202. FIG. 9 shows waveforms of signals in various parts of the embodiment indicated in FIG. 8.

A clock signal $\overline{H}$, which is in synchronism in phase with the horizontal synchronization signal, as indicated in FIG. 9 (a), is outputted from the output terminal of the waveforming circuit 58. This signal $\overline{H}$ is inputted to the NAND gate 200. When this clock signal $\overline{H}$ is high, the multiplying circuit 54 constitutes an oscillating circuit, together with the resistor 201 and the capacitor 202. When the clock signal is low, the multiplying circuit 54 does not oscillate.

Figure 9B:
Figure 11:
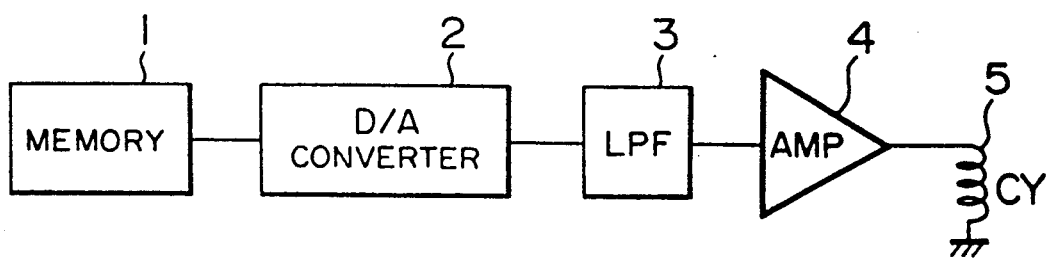
FIG. 11 is a block diagram illustrating a prior art convergence correction device.
Figure 12A:
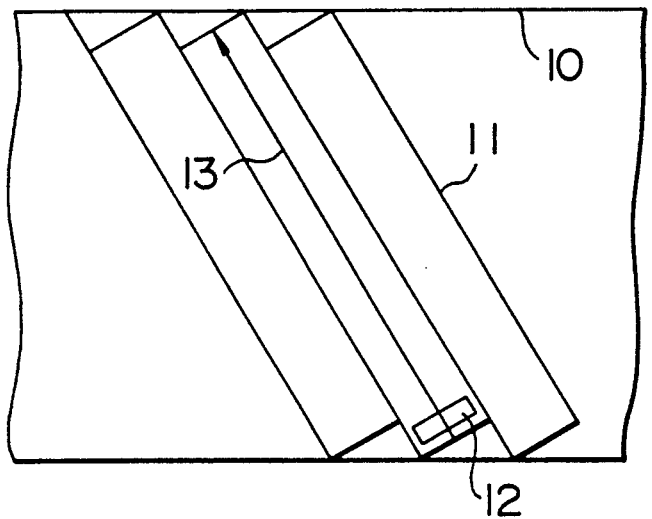
FIGS. 12(a) and 12(b) indicate the relation between tracks on a tape and the scanning thereof with a video head for usual reproduction using a VTR.
Figure 12B:
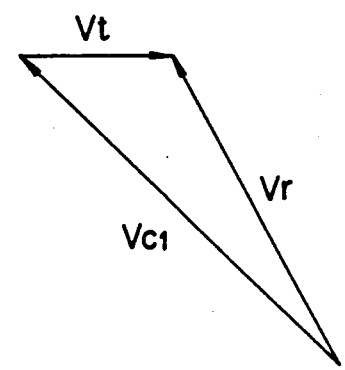
Figure 13A:
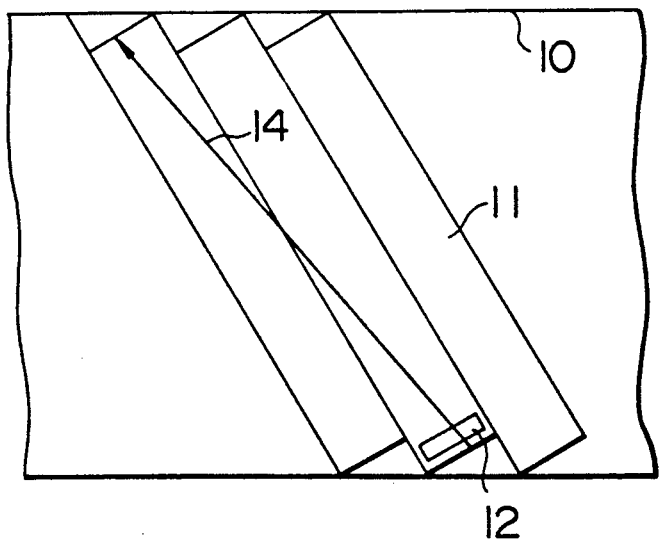
FIGS. 13(a) and 13(b) indicate the relation between tracks on a video tape and the scanning thereof with a video head for a reverse direction picture search for a VTR.
Figure 13B:
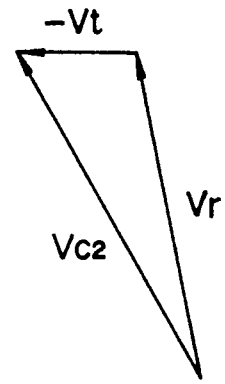

Consequently, the clock signal C, which is in synchronism with the clock signal H, is outputted from the multiplying circuit 54, as indicated in FIG. 9(b).

Further, the inverter 203 is used for forming the pulse H. According to this embodiment, the multiplying circuit 54 can be realized with a construction simpler than that of the multiplying circuit 54 indicated in FIG. 7.

FIG. 10 illustrates still another embodiment of this invention. The difference of between the embodiment indicated in FIG. 10 from that indicated in FIG. 1 consists in that the horizontal synchronization signal is used only once within one field. Apart therefrom, the pulse H having the same period as the horizontal synchronization signal is generated by counting the clock signal C.

In FIG. 10, reference numeral 61 indicates an extracting circuit taking out one of horizontal synchronization signals separated in the synchronization pulse separating circuit 51 by using the pulse V, which is in synchronism with the vertical synchronization signal. The counter 62 is started by the horizontal synchronization signal taken out by the extracting circuit 61. The counter 62 counts the clock signal C and generates one pulse H for every period of the horizontal synchronization signal to supply the pulse H to the line address counter 7 and the row address counter 8.

The clock signal C is generated by the multiplying circuit 54 and the waveforming circuit 60 on the basis of the horizontal synchronization signal separated by the synchronization pulse separating circuit 57.

The advantage of this embodiment consists in that it is not influenced by jitter in the horizontal synchronization signal. For example, in the case where a clock signal C supplied by another system is used, the delay time in the waveforming circuit cannot be specified. From this point of view this embodiment is advantageous.

In the above embodiments examples in which the correcting data in the 243-th or 256-th line are used as the last line for the convergence correcting data inputted in the memory at the adjustment are shown.

However, these are not necessary conditions. Rather this invention can be applied to any system, in which the number of scanning lines differs therefrom, such as PAL system television, SECAM system television, non-interlace double scanning line television, etc.

The important point of this invention consists in that the correcting data corresponding to the position of the last scanning line stored at the adjustment are used repeatedly so that the data originally deficient are complemented. The stored correcting data are obtained by an operation based on the values at the intersections (X, Y) in the lattice and the region of the value of y can be arbitrarily set.

Further, although, in the above explanation, the scanning lines and the lines in the memory correspond to each other, it is a matter of course that the scanning lines may correspond to the rows therein. In addition, although the vertical blanking pulse was used in the above as the reset pulse for the line address counter, this invention can be realized with a pulse synchronized in phase with the vertical synchronization pulse instead of the vertical blanking pulse.

Furthermore, although there were shown in the above the embodiments in which this invention was applied to a color television, it is a matter of course that this invention can be applied to the digital convergence correcting device in a projection type color video projecting device.

We claim:

1. A correcting data reading device in a digital convergence correcting device comprising:
   an image screen for displaying an image;
   a correcting data storing memory for storing convergence correcting data corresponding to a plurality of points on said image screen as digital correction data to be used for effecting convergence correction, said convergence correcting data further corresponding to a position on horizontal and vertical scanning lines of said image screen;
   first address signal forming means for generating a first address signal for reading out convergence correcting data from said correcting data storing memory which corresponds to a horizontal scanning direction of said image screen, and for supplying said generated first address signal to said correcting data storing memory;
   second address signal forming means for generating a second address signal for reading out convergence correcting data from said correcting data storing memory which corresponds to a vertical scanning direction of said image screen, and for supplying said generated second address signal to said correcting data storing memory;
   last address signal fixing means for determining that the second generated address signal supplied to said correcting data storing memory by said second address signal forming means is a last address signal and for repeatedly supplying said last address signal to said correcting data storing memory after having determined that the second generated address signal supplied to said correcting data storing memory is the last address signal; and
   reset means for supplying a reset signal for resetting said second address signal forming means when vertical scanning on said image screen is terminated.

2. A correcting data reading device in a digital convergence device according to claim 1, wherein:
   said first address signal forming means is composed of a row address counter, said row address counter generating a row address signal while counting inputted clock signals and supplying said row address signal as said generated first address signal to said correcting data storing memory;
   said second address signal forming means is composed of a line address counter, said line address counter, to which clock signals are supplied in synchronism with a horizontal signal, generating a line address signal while counting said supplied clock signals and supplying said line address signal as said generated second address signal to said correcting data storing memory;

said last address signal fixing means is composed of a judging circuit, said judging circuit detecting that said line address signal supplied to said correcting data storing memory by said line address counter is the last address signal and supplying a signal for holding said last address signal of said line adres counter in order to stop the counting of said line address counter;

said reset means supplies a signal in synchronism with a vertical synchronization signal as a reset signal to said line address counter; and said device further comprises a multiplying circuit, to which a horizontal synchronization signal is inputted, which generates said inputter clock signals by multiplying frequency of the inputted horizontal synchronization signal and supplies said inputted clock signals to said row address counter.

3. A correcting data reading device in a digital convergence correcting device according to claim 2, further comprising:

means for supplying a line address signal of a predetermined number of digits among line address signals which are supplied to said correcting data storing memory from said line address counter to an input of a NAND gate included in said correcting data reading device;

means for stopping the counting of said line address counter based on a signal outputted by said NAND gate; and means for supplying said last address signal to said correcting data storing memory.

4. A correcting data reading device in a digital convergence correcting device according to claim 2, wherein:

said multiplying circuit is composed of a PLL circuit, said PLL circuit comprising:

a voltage controlled oscillator (VCO) to which a voltage signal is inputted and which generates a clock signal having a frequency corresponding to the inputted voltage signal; p1 a (1/n) frequency divider which divides the clock signal outputted by said voltage controlled oscillator (VCO) by n and outputs the divided clock signal; and a phase comparator to which the horizontal synchronization signal and the divided clock signal outputted by said frequency divider are inputted and which detects a phase difference between said horizontal synchronization signal and said divider clock signal outputted by said frequency divider and which generates a voltage signal corresponding to said phase difference which is supplied to said voltage controlled oscillator (VCO).

5. A correcting data reading device in a digital convergence device according to claim 2, wherein said multiplying circuit is composed of:

a NAND circuit having a first input terminal to which the horizontal synchronization signal is inputter, a second input terminal which is grounded through a capacitor, from which said inputted clock signals are outputted; and a resistor connected between said second input terminal and said output terminal of said NAND circuit.

6. A correcting data reading device in a digital convergence correcting device comprising:

an image screen for displaying an image; p1 a correcting data storing memory for storing convergence correcting data corresponding to a plurality of points on said image screen as digital correcting data to be used for effecting convergence correction, said convergence correcting data further corresponding to a position on horizontal and vertical scanning lines of said image screen;

a row address counter which generates a row address signal by counting inputted first clock signals and which supplies said row address signal as a read out address signal to said correcting data storing memory, said row address counter being reset by an inputted first reset signal;

a multiplying circuit, to which a horizontal synchronization signal is inputted and which generates said first clock signals by multiplying frequency of the inputted horizontal synchronization signal, said multiplying circuit supplying said first clock signals to said row address counter;

a line address counter which generates a line address signal by counting inputted second clock signals and which supplies said row address signal as a read out address to said correcting data storing memory, said line address counter being reset by an inputted second reset signal;

an extracting circuit to which the horizontal synchronization signal and a vertical synchronization signal are inputted which extracts a horizontal synchronization signal for every field and outputs said extracted horizontal synchronization signal;

a counter to which a signal outputted by said extracting circuit and said first clock signal supplied by said multiplying circuit are inputted and which counts said first clock signals, using a signal inputted from said extracting circuit as a start signal, generates a pulse for each one of a plurality of horizontal scanning periods, and simultaneously supplies each pulse as the first reset signal to said row address counter and as at least one of the second clock signals to said line address counter;

reset means for supplying a signal synchronized with said vertical synchronization signal as the second reset signal to said line address counter; and a judging circuit which determines that said address signal supplied to said correcting data storing memory by said line address counter is a last address signal and which supplies a signal for holding said last address signal of said line address counter in order to stop the counting of said line address counter.

7. A correcting data reading device in a digital convergence correcting device, in which convergence correcting data for a plurality of points on an image screen, on which an image is displayed, are stored in a memory as digital correcting data, on the basis of which convergence correction is effected, comprising:

correcting data storing memory, said memory storing said convergence correcting data for said image screen, on which an image is displayed, making said convergence correcting data correspond to the position on horizontal and vertical scanning lines;

first address signal forming means, which generates a first address signal for reading out said convergence correcting data corresponding to the horizontal scanning direction on said image screen and supplies said first address signal thus generated to said correcting data storing memory;

second address signal forming means, which generates a second address signal for reading out said convergence correcting data corresponding to the vertical scanning direction on said image screen and supplies said second address signal thus generated to said correcting data storing memory;

last address signal fixing means, which detects that the address signal supplied to said correcting data storing memory by said second address signal forming means is the last address signal and repeatedly supplies said last address signal to said correcting data storing memory after having detected that the address signal supplied to said correcting data storing memory is the last address signal; and reset means, which supplies a reset signal resetting said second address signal forming means, in the case where the vertical scanning on said image screen is terminated.

wherein:

said first address signal forming means is composed of a row address counter, said row address counter generating a row address signal while counting inputted clock signals and supplying said row address signal as a first address signal to said correcting data storing memory;

said second address signal forming means is composed of a line address counter, said line address counter, to which clock signals are supplied in synchronism with the horizontal signal, generating a line address signal while counting said inputted clock signals and supplying said line address as a second address signal to said correcting data storing memory;

said last address signal fixing means is composed of a judging circuit, said judging circuit detecting that said line address signal supplied to said correcting data storing memory by said line address counter is the last address signal and supplying a signal for holding said last address signal to said line address counter, stopping the counting operation of said line address counter;

said reset means supplies a signal in synchronism with said vertical synchronization signal as a reset signal to said line address counter;

said device comprises further a multiplying circuit, to which the horizontal synchronization signal is inputted, and which generated clock signals by multiplying the frequency of the inputter signal and supplies said clock signals to said row address counter; and said multiplying circuit is composed of a NAND circuit, to one input terminal of which the horizontal synchronization signal is inputted and the other input terminal of which is grounded through a capacitor, the clock signal being outputted from the output terminal, and a resistor connected between the other input terminal of said NAND circuit, which is grounded through said capacitor, and said output terminal.

* * * * *